United States Patent [19]
Jones

[11] Patent Number: 6,098,784
[45] Date of Patent: Aug. 8, 2000

[54] APPARATUS FOR SEPARATING AND ORIENTING POUCHED ARTICLES

[75] Inventor: David A. Jones, 414 Allgood Street, Richmond Hill, Ontario, Canada, L4C 2Z2

[73] Assignee: David A. Jones, Ontario, Canada

[21] Appl. No.: 09/055,222

[22] Filed: Apr. 6, 1998

Related U.S. Application Data

[63] Continuation-in-part of application No. 08/834,511, Apr. 4, 1997.

[51] Int. Cl.<sup>7</sup> .................................................. B65G 47/12
[52] U.S. Cl. ............................................................. 198/443
[58] Field of Search ..................... 198/392, 396, 198/400, 443, 459.5, 460.1, 461.2, 463.5

[56] References Cited

U.S. PATENT DOCUMENTS 4,007,854 2/1977 Ervine ...................................... 198/392
4,729,501 3/1988 Lowrance .

*Primary Examiner*—Joseph E. Valenza
*Attorney, Agent, or Firm*—Fitzpatrick, Cella, Harper & Scinto

[57] ABSTRACT

An apparatus for separating flexible packages has a first stage. The first stage has an inclined conveyor having a lower end for receiving flexible packages and an upper end. The inclined conveyor has an inclination sufficient for causing an overlying flexible package to slide relatively to an underlying flexible package as the flexible packages travel from the lower end to the upper end. A drum is rotatably mounted for receiving the flexible packages from the upper end. The drum has a plurality of radially extending resilient paddles for successively engaging and carrying the flexible packages as the drum rotates. The successive engagements and rotation vibratingly separate the flexible packages and discharges a stream of substantially separated flexible packages.

6 Claims, 5 Drawing Sheets

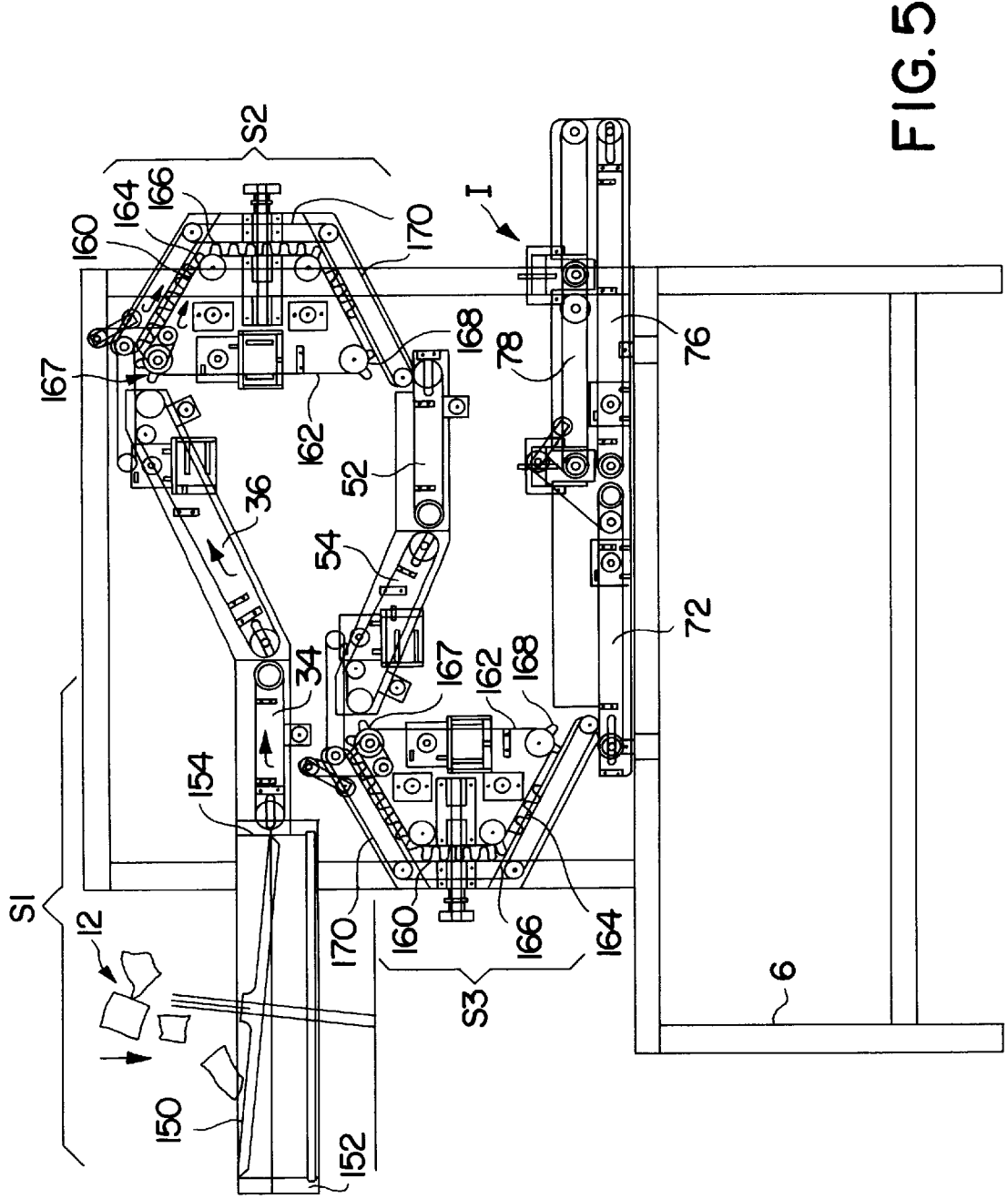

APPARATUS FOR SEPARATING AND ORIENTING POUCHED ARTICLES

This application is a continuation of part of U.S. patent application Ser. No. 08/834,511, filed Apr. 4, 1997.

FIELD OF THE INVENTION

The present invention relates to a package handling device for separating and orienting flexible pouched articles. In particular, the present invention provides an apparatus for mechanically separating and orientating pouched articles for individually inserting each pouched article into a container such as a bag or box.

BACKGROUND OF THE INVENTION

Many products are packaged in flexible pouches or sealed bags or envelopes. Typically, these pouches are of a rectangular shape and contain food products such as seasonings, salad dressings, cereals, and candies. For example, a caesar salad kit includes a foil pouch of salad dressing, a cellophane pouch of croutons, a foil envelope of seasonings, all packaged in a cellophane bag of chopped romaine lettuce. However, each of these items must be hand sorted and manually placed within the cellophane bag for sealing. The reliance on manual labour increases food packaging time and costs.

There does not exist an automated machine which can separate and orient pouched product for insertion into a recipient container. The flexibility of the pouch prevents effective sorting and handling. As pouches are handled, they change shape and clump together making it difficult to separate the pouched products and then orient them so that they can be individually inserted into a recipient container.

There are prior art devices which separate and orient hard-surfaced objects such as wooden flat holder sticks or nuts and bolts. For example, U.S. Pat. No. 4,729,501 to Lowrance, provides an automatic feeder apparatus for automatically inserting flat holder sticks into individual food products such as ice cream bars and wieners. This device uses a series of agitator rollers having a plurality of circumferentially spaced longitudinal-shaped flutes. The series of rollers agitates the unaligned sticks and discharges the sticks onto a set of ramps to slide into a slot. This device would not be suitable for flexible items since the flexible items would tend to clump together and be delivered in bunches of two or more.

SUMMARY OF THE INVENTION

An object of the present invention is to provide a novel apparatus for the separation and orientation of pouched articles which mitigates or obviates the disadvantages of the prior art.

According to one aspect of the invention, there is provided an apparatus for separating flexible packages having a first stage which has an inclined conveyor having a lower end for receiving flexible packages and an upper end. The inclined conveyor has an inclination sufficient for causing an overlying flexible package to slide relatively to an underlying flexible package as the flexible packages travel from the lower end to the upper end. A drum is rotatably mounted for receiving the flexible packages from the upper end. The drum has a plurality of radially extending resilient paddles for successively engaging and carrying the flexible packages as the drum rotates. The successive engagements and rotation vibratingly separate the flexible packages and discharges a stream of substantially separated flexible packages.

According to another aspect of the invention, there is provided an apparatus for separating flexible packages having a plurality of stages operably connected together to serially process the flexible packages. Each stage has an inclined conveyor having a lower end for receiving flexible packages and an upper end. The inclined conveyor has an inclination sufficient for causing an overlying flexible package to slide relatively to an underlying flexible package as the flexible packages travel from the lower end to the upper end. A drum is rotatably mounted for receiving the flexible packages from the upper end. The drum has a plurality of radially extending resilient paddles for successively engaging and carrying the flexible packages as the drum rotates. The successive engagements and rotation vibratingly separate the flexible packages and discharges a stream of substantially separated flexible packages.

BRIEF DESCRIPTION OF THE DRAWINGS

Drawings which illustrate embodiments of the present invention will now be described, by way of example only, with reference to the attached Figures, wherein:

FIG. 5 is a side elevational view of an apparatus for separating and orienting pouched articles in accordance with a third embodiment of the present invention.

DETAILED DESCRIPTION OF THE INVENTION

Figure 1:
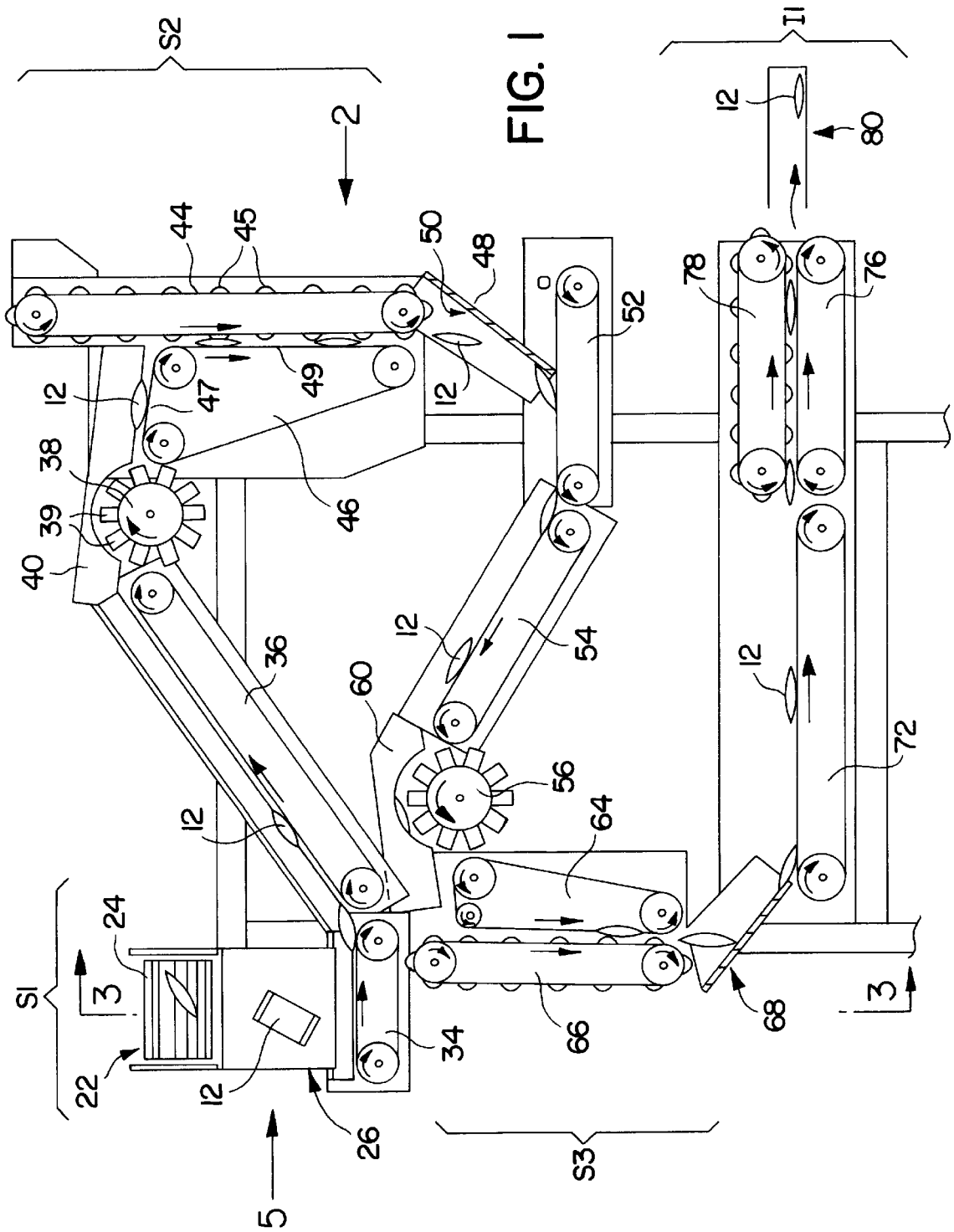
FIG. 1 is a side elevational view of an apparatus for separating and orienting pouched articles in accordance with the present invention.
Figure 2:
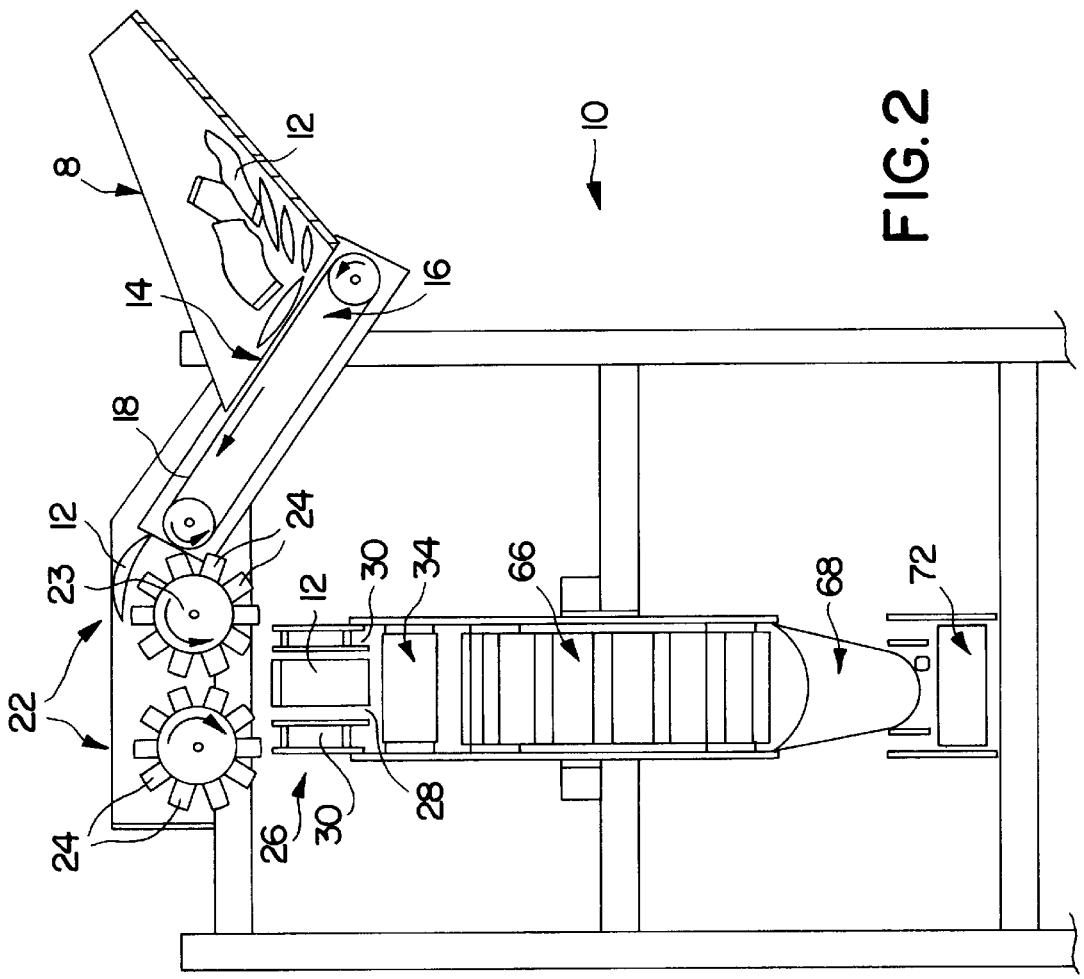
FIG. 2 is an end elevational view of a first stage of the apparatus of FIG. 1.
Figure 3:
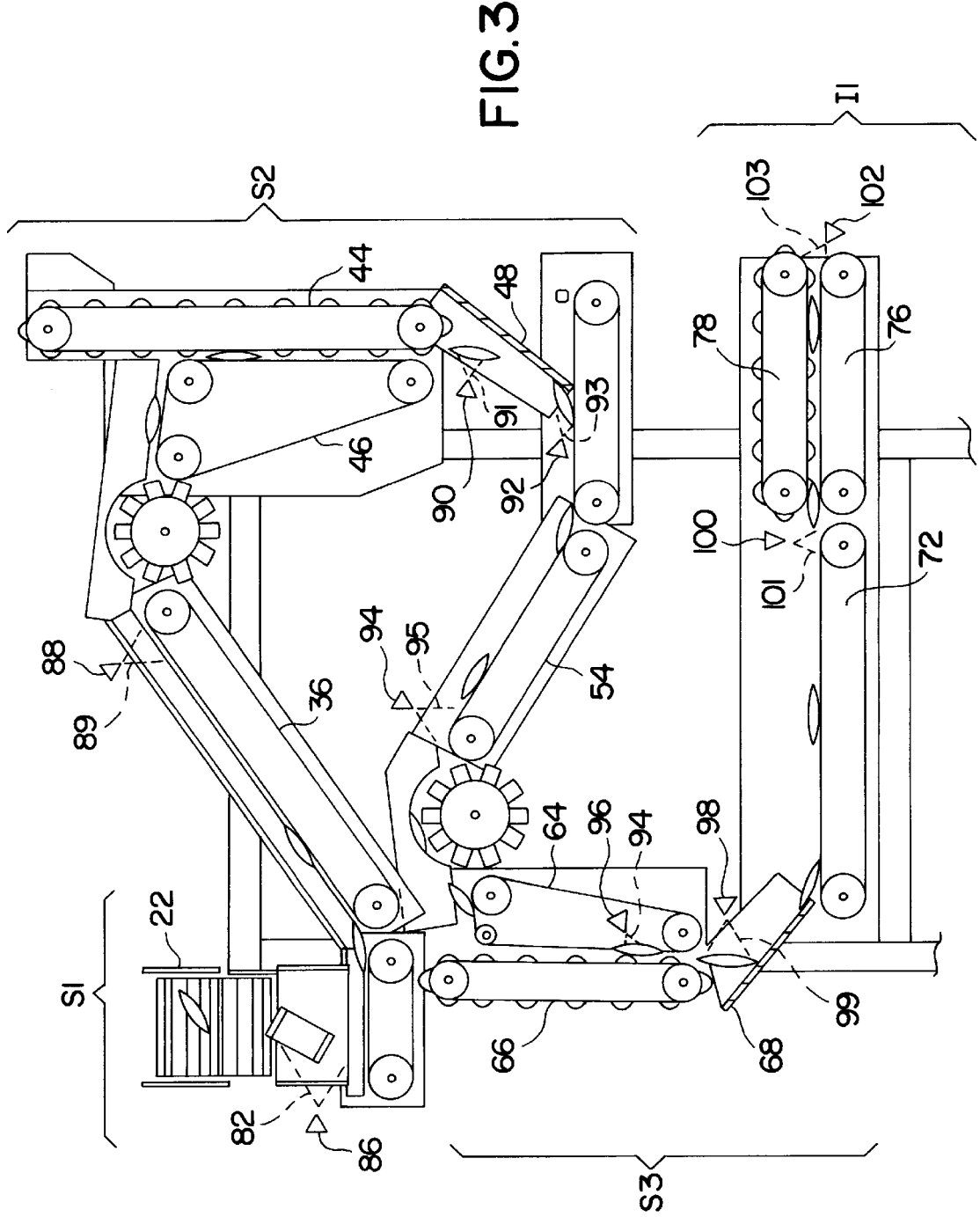
FIG. 3 is a side elevational view of the apparatus of FIG. 1, illustrating the sensors for controlling the efficient throughput of the apparatus.

A first embodiment of the present invention is illustrated in FIGS. 1–3. As shown in FIG. 1, the apparatus of the present invention, generally designated as reference numeral 10, comprises a first stage S1, a second stage S2, an optical third stage S3 and an injector I. The stages are operably connected together for serial processing of a stream of flexible articles flowing from an upstream end at stage S1, through stages S2 and S3, respectively, to a downstream end at injector I. In this, and subsequent, illustrated embodiments, apparatus 10 is shown mounted to a frame 6. Frame 6 can be replaced by any suitable support structure providing an appropriate flow path for articles to be separated and oriented. Equally, apparatus 10 can be incorporated into pre-existing production lines and can be mounted on existing supports within an article flow path.

Referring to FIG. 2, first stage S1 is illustrated. First stage S1 comprises a hopper 8 mounted to frame 6. Hopper 8 has an open bottom 14 for gravity feeding of articles 12 onto a conveyor 16.

Articles 12 are can be any flexible product. Generally, articles 12 will be pouches having an outer membrane for containing the contents thereof. As is well known, the outer membrane of such pouches can be aluminum foil, food grade plastic, or any other suitable material. Where articles 12 are pouches, they are generally in the form of thin, rectangular pouches, such as those used in the food industry for holding sauces, salad dressings, prepared foods and other ingredients. As will be apparent, the present invention is not limited to rectangular pouches, but can accommodate articles of numerous sizes, shapes and materials.

From hopper 8, articles 12 pass to a conveyor 16. Conveyor 16 transports the articles on a conveyor belt 18. Conveyor belt 18 has a plurality of transverse ridges 20 to frictionally engage the surface of the articles 12. Inclined conveyor 16 transports articles 12 towards a pair of spaced counter rotating drums 22.

In addition to transverse ridges 20, surface of conveyor 18 can have a coefficient of friction greater than the coefficient of friction of the surfaces of the articles 12 themselves. This difference in frictional coefficients facilitates the force of gravity to cause stacked or overlapping articles 12 to slide downwardly relative to one another staggering the articles 12.

Each drum 22 is elongate with a series of radially extending flexible paddles 24 running along the length of each drum 22. The paddles 24 are fabricated from a resilient material, such as rubber or a coated closed cell foam material, to permit paddles 24 to deform as articles 12 are fed between the counter-rotating drums 22. It is further contemplated that the paddles 24 may be a series of cylindrical teeth and manufactured from rubber or polyurethane foam. It is contemplated that the size, shape, and flexibility of the paddles 24 and the spacing of the drums 22 can be adjusted to accommodate different types and sizes of flexible packages.

Mounted immediately below drums 22, for receiving articles which have passed therebetween, are orienting guides 26 and conveyer 34. Guides 26 comprises a pair of walls 30 which define a channel 28. The separation of the wall surfaces 30 is approximately equal to, or greater than, the width of the articles 12. Guides 26 are intended to orient articles 12 as each falls from between drums 22 to conveyor 34.

Discharge conveyor 34 is positioned below drums 22 and receives the articles 12 from drums 22. Discharge conveyor 34 rotates in the direction of the arrow to feed articles 12, which are oriented in a longitudinal direction to the second stage S2.

Stage S2 comprises an upwardly inclined conveyor 36, which is similar in construction to inclined conveyor 16. The inclined conveyor 36 operates in a manner similar to inclined conveyor 16 to separate bunched or overlying articles 12 which remain bunched, or adhered together, after passage through the first stage S1.

Inclined conveyor 36 transports the articles 12 towards a rotating drum 38. Drum 38 has a number of radially extending paddles 39 which are similar in construction to the paddles 24 of counter-rotating drums 22. Drum 38 is positioned to receive article 12 from conveyor 36. The paddles 39 and rotation of drum 38 serve to tumble articles 12 and further aid in separating the articles 12.

To improve the separation of the articles 12, drum 38 can rotate to have a tip speed of each of the paddles greater than the surface speed of inclined conveyor 36. Similarly, inclined conveyor 36 can operate at a faster rate than the discharge conveyor 34. The increase speed in the next downstream components tends to pull each article into the next component enhancing the separation of the articles.

A second orienting guide 40 is radially spaced from and extends circumferentially about drum 38. The guide 40 extend over a flat conveyor belt 46. The spacing between the guide 40 and the drum 38 and between guide 40 and conveyor belt 46 is approximately equal to the thickness of the article 12.

Flat conveyor belt 46 is configured with a substantially triangular travel path. Flat conveyor 46 has a first section 47 for receiving the oriented article 12 from drum 38 and guide 40, and a second section 49 spaced from an egg belt 44. First section 47 transports the article 12 from the drum 38 to the egg belt 44. Second section 49 cooperates with egg belt 44 to urge each article 12 therebetween during transport thereof.

Egg-type conveyor 44 is of known construction and positioned with respect to second section 49 of conveyor 46 to define a vertical path extending therebetween. Egg-type conveyor 44 has a plurality of flexible protruding ridges 45. The egg belt surface is common to the poultry and egg processing industry. The ridges 45 conform to the shape of the article 12 as it is pinched or sandwiched between the conveyor 46 and the egg-type conveyor 44, thereby holding the oriented articles 12 in a fixed orientation from the guide 40. The flexible nature of the ridges 45 on the egg conveyor 44 holds the article 12 without damaging it and prevents article 12 from losing its longitudinal orientation as it is transported downwardly.

A first guide chute 48 is positioned below egg conveyor 44 and conveyor 46 for receiving the articles 12. The inner surface 50 of first guide chute 48 has a frusto-conical surface which prevents the longitudinally oriented articles 12 from rotating and losing orientation during the slide down the chute 48.

Conveyor 52 is positioned at the discharge end of chute 48 to receive each article 12. Conveyor 52 communicates with the third stage S3 to deliver oriented and separated articles 12.

Third stage S3 is similar in construction to second stage S2. Third stage S3 has an inclined conveyor 54, a rotating drum 56, paddles 57, a guide 60, a belt conveyor 64, an egg belt conveyor 66, a chute 68 and a conveyor 72. Each component of third sage S3 is identical to the respective components of second stage S2, and serves to further ensure that articles 12 are conveyed individually to injector I.

The third stage S3 is positioned to communicate with second stage S2. Inclined conveyor 54 receives each article 12 from conveyor 52.

The third stage S3 communicates with the injector I. I comprises a flat conveyer 76 and an egg conveyor 78. Egg conveyor 78 overlies flat conveyor 76 to define a path therebetween. Preferably, the speeds of conveyor flat conveyor 76 and egg conveyor 78 are faster than horizontal belt 72. If the relative speed of conveyors 76 and 78 is approximately 25% greater than that of conveyor 72, then as an article 12 is transported from horizontal belt 72 to conveyors 76 and 78, conveyors 76 and 78 will grab and pull each successive article ensuring separation of articles and thereby reduce the chance of two articles 12 being deposited into the package 80.

It can now readily be understood by those skilled in the art that the quantum of increased relative speed of the downstream conveyor will depend upon the size and nature of the articles or products being sorted and separated. It is possible for speeds of the downstream conveyor to be in the range of 3 or 4 times faster than the upstream conveyor.

In the embodiment illustrated in FIGS. 1–3, the apparatus of the present invention has a circuitous path serpentining across and about the frame 6. It can be readily understood by those skilled in the art that the path of the articles could be arranged in any desired path to deliver the articles to their final destination for processing.

Microprocessors, coupled to sensors can cause flat conveyor 76 and egg type conveyor 78 to selectively rotate to eject a longitudinally oriented article into an appropriate recipient package 80 one at a time, as desired for a particular packaging operation.

Each of the conveyors and drums are operatively connected to a number of motors, other drive means, for driving same. Such connections may be any suitable drive engagement known in the art, including chain drives, belt drives or screw drives.

In operation, articles 12 are dumped, or otherwise fed, into hopper 8 of stage S1. The bottommost articles will gravity feed through aperture 14 and contact the conveyor surface 18 of the inclined conveyor 16. The articles in contact with the conveyor surface 18 will be pulled from the pile in a random manner, sometimes in clumps of articles. The inclination of the conveyor 16 allows gravity to act upon the articles 12 to cause the overlying articles to slide relative to the articles on the conveyor 16 leaving the leading edge of the article on the conveyor available for grabbing by the next component, thereby effecting an initial staggering or separation of the articles.

The counter-rotating drums 22 will engage the leading edge of the article. The plurality of radially extending paddles 24 will successively engage and carry the articles as the drum rotates. The successive engagements and rotation will vibratingly separate the articles and discharge a stream of substantially separated articles 12. The rotation of the drum moves the article 12 over top of the receiving drum and then downwardly between the two drums 22. The speed of rotation of the counter-rotating drums 22 being chosen to be faster than the speed of the conveyor 18. The receiving drum 23 pulls the article 12 off of the conveyor 18 to separate the article from any overlying article. The receiving drum 23 will then engage the next successive article on conveyor 18.

Each article 12 is agitated or jostled by the rotating paddles 24 as the article 12 is driven between the rotating drums 22 between guides 26. The jostling and agitating action caused by the rotating paddles 24 urges each article 12 to orient in a direction substantially parallel to the wall surfaces 30 of the guides 26, thereby longitudinally orienting each article 12. Each article 12 is deposited on conveyor 34 substantially separated and oriented.

In some cases, the articles 12 may be adequately separated and oriented by the first stage S1. Generally, however at lease one additional separation and orienting stage will be necessary to adequately separate and orient the articles.

Referring back to FIG. 1, the article 12 is transported along conveyor 34 to second stage S2. Inclined conveyor 36 receives articles 12 and will urge overlying articles, if any, to slide relative to the article in contact with the conveyor 36. Drum 38 will grab the leading edge of each article 12. Similar to the first stage, drum 38 can rotate at a tip speed greater than that of the conveyor 36. The article 12 will travel about drum 38 between the paddles 39 and guide 40 and then to conveyor 46. Conveyor 46 will then transport the article 12 downwardly to chute 48 and then to conveyor 52.

The article 12 is transported along conveyor 52 to the optional third stage S3. Inclined conveyor 54 receives articles 12 and will urge overlying articles, if any, to slide relative to the article in contact with the conveyor 54. Drum 56 will grab the leading edge of each article 12. Similar to drums 22 and 38, drum 56 is rotating at a speed greater than that of the conveyor 54. The article 12 will travel about drum 56 between the paddles 57 and guide 60 and then to conveyor 64. Conveyor 64 will then transport the article 12 downwardly to chute 68 and then to conveyor 72.

The article 12 is then transported to the injector I. Conveyors 76 and 78 will grab each successive article 12 from conveyor 72 and will eject the now oriented and separated article 12 into package 80, or feed article 12 to further processing stage.

In the first embodiment of the first stage S1, two counter-rotating drums 22 have been illustrated. However, as will be apparent to those skilled in the art, one of the drums 22 can be replaced by a guide, such as guide 40, as described for stages S2 and S3.

Referring to FIG. 3, a series of sensors 86, 88, 90, 92, 94, 96, 98, 100, and 102, are positioned throughout the apparatus to detect the location of articles 12 at different locations along the path. Generally, the sensors are opto-electronic and include a signal generator to emit a signal, such as a laser beam, which is reflected off the article 12 as is passes through the field of view or breaks the light beam. A photo electric eye detects the presence or absence of the laser beam and generates a corresponding detection signal. In each case, the detection signal is sent to a control computer processor which initiates a responsive action as described below.

Sensor 86 emits a detection beam 87 immediately below counter-rotating wheels 22. Sensor 88 emits detection beam 89 to detect the presence of a article 12 at the top of inclined conveyor 36. Sensor 90 emits detection beam 91 near the bottom of the vertical transport path of conveyor 46 and egg conveyor 44. Sensor 92 emits detection beam 93 to detect a article 12 at the bottom of guide chute 48. Sensor 94 emits detection beam 95 to detect the presence of a article 12 at the top of inclined conveyor 54. Sensor 96 emits detection beam 97 to detect the presence of article 12 near the bottom of egg conveyor 66 and conveyor 64. Sensor 98 emits detection beam 99 to detect the presence of a article falling from conveyors 66 and 64 onto guide chute 68. Sensor 100 emits a detector beam 101 to detect the presence of a article 12 at the end of discharge conveyor 72 at a point adjacent to conveyors 78 and 76. Sensor 102 emits detection beam 103 to detect the presence of a articled product 12 near the end of the dispensing means 74.

In operation, the sensor are coordinated to control various conveyors and rotating drums as follows. If a article 12 is detected by sensor 102 at the injector I1, belts 76 and 78 are signalled to stop. This is the first step in staging articled product 12 so that it is ready to be inserted into a container 80, or otherwise fed to a packaging system. Next, sensor 100 detects whether a article 12 is at the downstream end of the discharge conveyor 72. If not, conveyor 72 is engaged after sensor 98 detects a article 12 sliding down chute 68. If sensor 96 detects a article 12 then conveyors 64 and 66 can be disengaged retaining an article ready for delivery to chute 68. If a article 12 is detected by sensor 94, then inclined conveyor 94 can be disengaged. If not, conveyor 94 can be engaged after sensor 92 detects a article 12 at the bottom of chute 48 and operates until sensor 94 detects a article. If sensor 90 then detects a article 12 in the downstream end of the opposed counter-rotating conveyors 44 and 46, then the conveyors 44 and 46 are disengaged. If sensor 88 detects the presence of a articled 12 at the top of the inclined conveyor 36, then inclined conveyor 36 is disengaged as product is ready to be delivered to rotating wheel 38. If sensor 86 detects the presence of a article 12 falling below rotating wheels 22, then rotating wheels 22 and the first inclined conveyor 16 can be disengaged.

It is contemplated that the sensors and attendant control system, as described above, can ensure a smooth throughput of oriented articles in a "just in time" delivery system. Other control systems, as will be apparent to those skilled in the art can be employed as desired.

Figure 4:
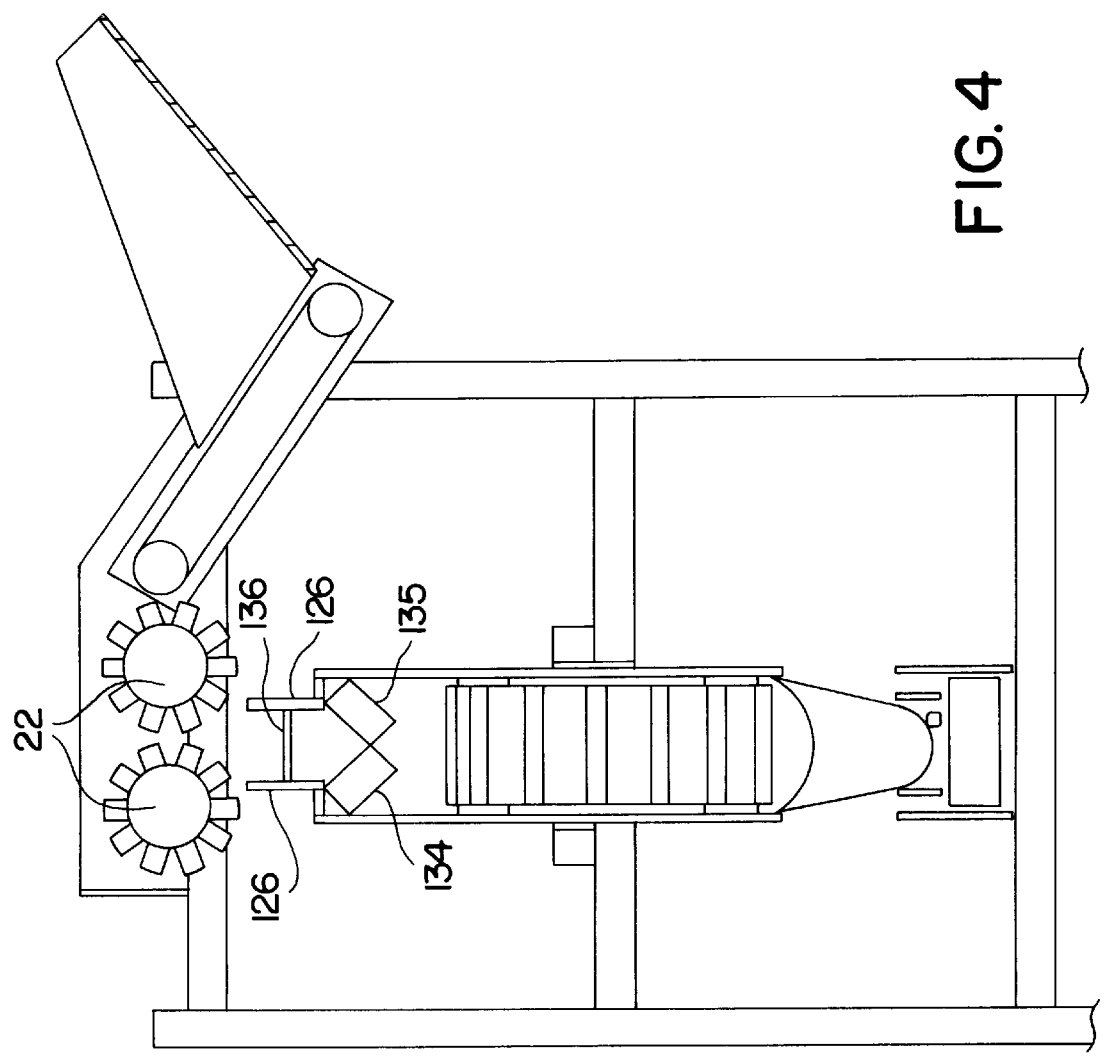
FIG. 4 is an end elevational view of a first stage in accordance with a second embodiment of the present invention.

Referring now to FIG. 4, a second embodiment of the first stage discharge conveyor is illustrated. The discharge conveyor comprises conveyors 135 and 135 arranged in a V shape. Guides 126 are spaced relatively above the conveyors 134 and 135 for orienting articles as each falls from between drums 22. Guides 126 has a bar 136 at the downstream end.

In operation, articles will fall between the guides 126 and will be oriented in a direction of the conveyors 134 and 136. The V orientation of the conveyors 134 and 136 will maintain the general orientation of articles and will transport each article to the next stage. If a article stands on end in the general orientation, then bar 136 will tip the article over to put the article is a desired orientation. It will be understood that the height of the bar 136 will depend on the size of the articles being processed.

In a third embodiment, illustrated in FIG. 5, stage S1 is replaced by a spinning plate, or surface, 150 which feeds articles 12 to conveyor 34, and thence to stage S2. Plate 150 is a generally disk shaped surface mounted to spin about its axis within a hopper box 152. Plate 150 is inclined in the direction of the article throughout, i.e. towards conveyor 34, and box 152 has an opening 154 coinciding with conveyor 34.

In operation, as articles 12 are fed onto the spinning plate 150, centrifugal force will force them upward and to the outer edges of the plate, and gravitational force will cause them to settle at the lower most edge of the plate, in proximity to conveyor 34. The gripping surface of conveyor 34 will then tend to pull an article 12 for conveyance to conveyor 36, as previously described.

Spinning plate 150 simplifies the construction and reduces the cost of manufacture of apparatus 10 by eliminating rotating drums 22 and complex feed mechanisms 34, 66 or 134 and 66. In addition, stage S1 in the embodiment of FIG. 5 requires less space in a production line than the previous embodiments.

Stage S2 has also been modified in this third embodiment. It has been found that drum 38, conveyor 46 and egg conveyor 45 can be replaced by a continuous paddle conveyor 160, rotating in the direction of articles flow, and acting in conjunction with a holding conveyor 170. Paddle conveyor 160 is a belt 162 having paddles 164 along its surface. Paddles 164 are of similar construction to the paddles 39 on drum 38. Paddle conveyor 160 follows a generally trapezoidal path, extending tips 166 of paddles 164 to the ends of conveyors 36 and 52 at the respective vertices 167, 168 along the long edge of the trapezoid.

In operation, as articles 12 reach the end of conveyor 36, at vertex 167, they are engaged by the extending tips 166 of paddles 164. Paddles 164 bounce and separate articles 12 and are intended to pull single articles 12 into the path defined between paddle conveyor 160 and holding conveyor 170, and to feed the articles onto conveyor 52 at vertex 168. Depending upon the nature of articles 12, further separation can be achieved by adding further stages similar in construction to stage S2. The particular shape and configuration of stage S2 can be adapted to suit the space requirements of the packaging line.

It now can be appreciated that the apparatus of the present invention provides an automated device for the separation and orientation of articles products, thereby reducing the manual labour in the article handling process.

The above described embodiments of the present invention are intended to be examples of the invention and alterations and modifications may be effected thereto, by those of skill in the art, without departing from the scope of the invention which is defined solely by the claims appended hereto.

I claim:

1. An apparatus for separating pouched articles comprising:

an inclined surface rotatably mounted for receiving said articles, a rate of rotation for said inclined surface being sufficient to cause articles to travel to an outer edge of said surface;

a discharge conveyor disposed adjacent said outer edge for successively engaging and carrying said articles as said surface rotates, said successive engagements separating said articles and discharging a stream of substantially separated articles;

at least one second inclined conveyor having a lower end for receiving said stream from said discharge conveyor and an upper end, said second inclined conveyor having an inclination sufficient for causing an overlying article to slide relatively to an underlying article as said stream travels from the lower end to the upper end.

at least one third conveyor having a plurality of resilient paddles extending from, and generally perpendicular to, said conveyor, for successively engaging and carrying said articles of said stream as said conveyor travels, said successive engagements vibratingly separating said article, and discharging a second stream of substantially separated articles.

2. An apparatus as claimed in claim 1 wherein said discharge conveyor has a flat belt.

3. An apparatus as claimed in claim 1, wherein said third conveyor travels faster than said second inclined conveyor and said second inclined conveyor travels faster than said discharge conveyor.

4. An apparatus as claimed in claim 3, wherein said third conveyor has a complementary conveyor cooperating therewith for retaining said articles on said third conveyor.

5. An apparatus as claimed in claim 1, wherein said paddles are closed cell foam.

6. An apparatus for separating flexible packages having a plurality of stages operably connected together to serially process the flexible articles along a path moving from an upstream end to a downstream end, each of said stages having an inclined conveyor having a lower end for receiving said stream from a discharge conveyor and an upper end, said inclined conveyor having an inclination sufficient for causing an overlying article to slide relatively to an underlying article as said stream travels from the lower end to the upper end, a second conveyor having a plurality of resilient paddles extending from, and generally perpendicular to, said conveyor, for successively engaging and carrying said articles of said stream as said conveyor travels, said successive engagements vibratingly separating said articles, and discharging a stream of substantially separated articles.

* * * * *